United States Patent

[11] 3,607,798

| [72] | Inventor | Stephen S. Hirsch |
| | | Raleigh, N.C. |
| [21] | Appl. No. | 653,626 |
| [22] | Filed | July 17, 1967 |
| [45] | Patented | Sept. 21, 1971 |
| [73] | Assignee | Monsanto Company |
| | | Saint Louis, Mo. |

[54] HALOGEN TREATMENT OF AROMATIC POLYAMIDE-SHAPED ARTICLES
4 Claims, No Drawings

[52] U.S. Cl. .................................................. 260/2.5 N,
260/2.5 FP, 260/78 SC, 260/96 HA, 260/DIG. 24
[51] Int. Cl. ..........................................C08g 10/38,
C08g 53/08, C08g 53/20
[50] Field of Search............................................ 260/2.5 FP,
78 SC, 78, 96 HA, DIG. 24

[56] References Cited
UNITED STATES PATENTS

| 3,468,843 | 9/1969 | Busse | 260/78 SC |
| 2,829,070 | 4/1958 | Osborn | 260/96 |
| 2,880,183 | 3/1959 | Weissert | 260/2.5 |
| 2,964,517 | 12/1960 | Eck | 260/96 |
| 3,058,928 | 10/1962 | Eichorn | 260/2.5 |
| 3,063,966 | 11/1962 | Kwolek et al. | 260/78 |
| 3,132,169 | 5/1964 | Birum et al. | 260/461 |
| 3,423,371 | 1/1969 | Lusskin et al. | 260/78 |

FOREIGN PATENTS

| 841,946 | 7/1960 | Great Britain | 260/96 |

*Primary Examiner*—Murray Tillman
*Assistant Examiner*—Wilbert J. Briggs, Sr.
*Attorneys*—A. Milton Cornwell, Jr., Russell W. Weinkauf and Roy P. Wymbs

ABSTRACT: A process for the conversion of thermally stable aromatic polyamide-shaped articles into dimensionally stable fireproof products which involves a constructive heat treatment at elevated temperatures in an elemental halogen-containing atmosphere under carefully controlled conditions.

HALOGEN TREATMENT OF AROMATIC POLYAMIDE-SHAPED ARTICLES

BACKGROUND OF THE INVENTION

In recent years, considerable research effort has been directed toward the preparation of thermally stable aromatic polyamides for use in the form of films, fibers, fabrics and other shaped articles. The thermal stability requirements of polymers is constantly increasing with our advancing and more sophisticated technology. Recent efforts to further increase the thermal stability of polymers have included heat treatments to form partly or completely carbonized or graphitized fibers, replacement of some of the aromatic rings with heterocyclic rings and substitution of fluorine atoms for hydrogen atoms. However, all of these efforts have failed to achieve a polymeric product which has acceptable high molecular weight, dimensional stability, flexibility and strength together with outstanding resistance to free flame.

The process of this invention involves the treatment of thermally stable aromatic polyamides in an oxygen-free halogen-containing atmosphere resulting in fireproof products that are partially halogenated and retain dimensional stability and strength.

SUMMARY OF THE INVENTION

This invention relates to a process for the transformation of thermally resistant aromatic polyamides by halogens at elevated temperatures into products which are fireproof, halogen-treated dimensionally stable at high temperatures and flexible. Ar It has been found that when thermally stable aromatic polyamide compositions, in the form of fibers, fabrics or other useful shaped articles having a high surface to volume ratio, are treated with halogen gases or vapors with or without an inert diluent at high temperatures under carefully controlled conditions, they become partially dehydrogenated and halogenated, and are transformed into fireproof, flexible, dimensionally stable products. The optimum time-temperature conditions of treatment are critical and dependent to some extent on the polymer composition. If treated below a certain temperature, the desired transformation will not occur, or occurs at too slow a rate to be practical and the product obtained will burn on exposure to flames; if heated at too high a temperature or for too long a time in the optimum temperature range, the products, although nonflammable, become embrittled and lose some of their desirable physical properties. Satisfactory time and temperature conditions for most aromatic polyamides involve raising the temperature to about 250° to 500° C. and when reaching the desired temperature permitting exposure to the reagent for less than 1 minute to about 12 hours to complete the transformation. Exposure may also take place during heating.

For example, fabrics processed within the range of conditions specified in this invention are fireproof and can withstand direct exposure to the flames of a Meker burner (1100°–1200° C.) for periods of time exceeding 1 minute without loss of fibrous structure or dimensional form. The products are sufficiently flexible and dimensionally stable to permit use in practical applications requiring a high degree of thermal oxidative stability. In the form of fabrics the polymers of this invention are useful in electrical insulation, firewalls, nonwoven structures, firefighting suits, fireproof blankets and curtains, upholstery and filling materials in automobiles, aircraft and space vehicles, composites, laminates, ablatives and other uses requiring lightweight, fireproof products. As cellular compositions they are useful in lightweight structural materials, building insulation, impact absorbing and related applications. In addition these materials may be used in the form of paper and filters, such as for the filtration of sulfuric acid solutions, because of their chemical inertness.

Furthermore, articles produced by this process are useful as precursors for the production of fully carbonized or graphitized articles.

Accordingly, it is an object of this invention to provide a process for the transformation of thermally stable aromatic polymers into fireproof products having improved dimensional and thermal stability at elevated temperatures.

Another object of the invention is to provide a process for the preparation of articles having an improved resistance to chemical attack, and sufficiently flexible for fabrication.

Another object of the invention is to provide a process for the preparation of articles having low density, nonflammability and excellent thermal stability.

DETAILED DESCRIPTION AND PREFERRED EMBODIMENTS

Certain descriptive terms and expressions used herein have the meaning designated.

Thus, the term "fireproof" denotes the absence of burning and resistance to destruction of the article of direct exposure to hydrocarbon flames, such as from a Meker burner, for periods in excess of 1 minute. A fabric will retain its structural integrity initially, but will slowly be consumed on long and continued exposure to flame.

The term "flameproof" or "nonflammable" denotes that on exposure to direct flame, an initial flashoff may occur resulting in the conversion of the article to a fireproof product. Further, the article will not support combustion and will retain its structural integrity, as well as dimensional stability on exposure to flames. The dimensional stability of flameproof fabrics will not be quite as good as that of fireproof fabrics.

The term "flame resistant" denotes that the article on direct exposure to flame will burn very slowly, in comparison to the untreated article with some loss of structural integrity, and further that it will burn only while exposed to the flame. In the case of fiber and fabric, the material will soften, fuse and burn slowly.

The term "structural integrity" denotes that the physical form (and shape) of the article will not be changed to an appreciable extent. In the case of fibers and fabrics the individual filaments will remain distinguishable under the microscope after exposure to flame. The main implication of this term is that filament fusion does not occur.

"Dimensional stability" means that the size of the shaped article does not change appreciably on exposure to flames. In the case of fabric, a 1 square inch piece of fabric will shrink very slowly on exposure to flame, retaining better than 90 percent of its original dimensions for reasonable periods of exposure.

"Flexible" means that, in the case of fibers or fabrics, the article may be bent to the desired shape for fabrication without loss of physical properties. Further, the fibers or fabrics may be flexed with only a small percentage of the individual filaments being broken.

Typical of polymers useful in carrying out the process of this invention are those wholly aromatic polyamides, which may be characterized by the recurring structural unit

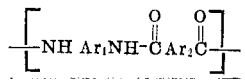

wherein $Ar_1$ and $Ar_2$ are divalent unsaturated carbocyclic ring compounds in which the chain extending bonds connecting $Ar_1$ and $Ar_2$ to nitrogen atoms and carbonyl groups respectively are attached to nonadjacent carbon atoms. The term "unsaturated carbocyclic ring" us used herein is intended to refer to any "aromatic ring system" which is of the arylene or heterocyclic type. The term arylene refers single, multiple and fused ring residues, such as phenylene, biphenylene and naphthalene. This term is also used here to apply to aromatic ring systems which have been modified by internal aromatic amide block units. $Ar_1$ and $Ar_2$ may be the same or different and may be an unsubstituted divalent aromatic radical or a substituted divalent radical; the substituents being attached to the rings being chosen from nitro, halogen, lower alkyl groups and the like. In the above formula either one or both of the Ar groups may contain optionally linkages other than carbon-carbon, such as

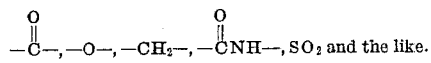

A preferred method for the preparation of these polymer compositions is by means of the reaction of an aromatic diamine or an amide modified aromatic diamine with an aromatic diacid halide as described in numerous patents and publications. These polymers are disclosed in U.S. Pat. Nos. 3,063,966, 3,232,910, 3,232,213 and 3,006,899.

Polymers useful in the process of this invention may be prepared interfacially or in solution, following general procedures described in patents and publications. Generally, these polymers may be prepared conveniently and preferably by reacting an aromatic diamine or an amide modified aromatic diamine with an aromatic diacid halide in a lower alkylamide solvent.

The polymers useful in the practice of this invention may be converted to fibers by well-known spinning techniques such as dry, dry-jet-wet-spinning or wet-spinning methods. The high melting points of most of these polymers prevents the use of melt-spinning techniques. The dry-spinning method is amply described in numerous patents; the dry-jet-wet-spinning and wet-spinning techniques useful in the preparation of fibers from these polymers are described in Belgian Pat. No. 665,638 and U.S. Pat. No. 3,079,219, respectively.

Fibers, films, fabrics and other shaped articles may be treated by the process described in this invention. Flameproof-shaped articles, such as for example woven tapes, or fabrics may have particularly, useful application in various end uses. Fibers, which have been treated by the process of this invention generally have lower elongation than the untreated samples from which they are made. Therefore, it may be desirable to weave fabrics or otherwise fabricate shaped articles from the untreated fibers and subsequently effect the fireproofing treatment. Where cellular materials are treated the resulting product is a lightweight fireproof and rigid composition.

The achievement of nonmelting and fireproof organic-shaped articles by the process of this invention is not brought about merely by incorporation of chlorine into the polymer. The chlorine pickup by the polymer is believed to be largely incidental to the properties obtained. Instead, it is believed that the unexpected effect of the halogen oxidant is the result of at least three processes. One, exposure of the polymer to halogen results in controlled reaction of easily oxidizable portions of the polymer molecule with the halogen rather than vigorous uncontrollable burning which occurs when conventional materials are thrust into a flame. Two, the reaction of the polymer with the halogen results in controlled cross-linking of the polymer as evidenced by diminished elongation and by insolubility. The resulting structuration of the molecules diminishes the tendency for small volatile fragments to be broken off upon being thrust into a flame, these fragments themselves burning and being observed as fire. Three, sufficient reactive sites remain on the polymer so that upon being thrust into a flame, extensive cross-linking and condensation reactions occur, giving rise to carbonaceous residues of the same shape as the original article. The in situ generated carbonaceous form resists temperatures of at least 3,000° C. It must be noted that if high halogen content were introduced into the polymer by employment of halogenated monomers, none of the above processes would occur and at best only self-extinguishing properties would be achieved.

In addition to the reactions resulting in the desired transformation it is also possible for other destructive degradation reactions to occur, which result in the breakdown of the polymer with the loss of physical structure and properties. It is probable that the type and rate of thermal decomposition reactions or processes that will occur in a given polymer during the process of this invention, are dependent on and determined by the values of energy of activation for the particular individual reactions with respect to a particular polymer structure. As a result, the optimum process conditions, minimizing the undesirable reactions, and enhancing those reactions leading to products having the superior properties attainable by the process of this invention, will vary to some extent with respect to the composition of the polymer being treated.

One possible explanation for this unexpected difference in behavior by two chemically similar polymer systems on exposure to the same set of treatment conditions as described in the process of this invention will be offered. In order that the desired transformation reactions take place without substantial change in the physical structure of the polymer, it is a necessary prerequisite that these reactions begin and progress to a substantial extent at a temperature below the softening point, or temperature at which physical changes begin to occur within the polymer. Or, expressed in a slightly different way, the threshold energy of activation values for the desired halogen reactions must be reached at a temperature below that at which changes in the physical structure of the polymer chain occurs. On the other hand, if the polymer softens, or changes in physical structure at a temperature below that at which the halogen reactions can take place (due to the fact that the activation energy values for reaction with halogen are not reached), other reactions leading to chain scission and polymer degradation are likely to occur in preference to the transformation reactions. In this case, the textile structure of the fibers and fabrics will be lost or so weakened during the process as to render the products obtained of little practical use.

The polymers useful in carrying out this invention are in general characterized by exceptionally high melting points and Tg values. In the practice of this invention, the conditions of time, temperature, rate of heating, and flow rates of the component gases can be varied and the set of conditions necessary to give optimum results for a given polymer system are easily determined by experiment. A programmed temperature treatment may be preferred with those polymers having lower melting points or Tg values; or with those polymers in which the rate of transformation into the desired products are extremely rapid. The rate of flow of halogen gas is not critical and may vary from about 0.1 to about 2 cubic feet per hour for small samples.

Other factors affecting the rate of conversion to the fireproof condition are polymer composition and composition of the halogeninert gas mixture and in the case of fabrics, for example, the type of weave, denier per filament, and fabric weight or thickness. The optimum conditions to be used in the practice of this invention are dependent upon the above factors and, in addition, to the desired properties of the end product. For a given sample and set of conditions, the article will first become flame resistant, and on continued exposure will become flameproof and finally fireproof. After becoming fireproof, continued exposure will cause a progressive deterioration in the properties of the article, the rate of deterioration being dependent upon the severity of the conditions.

In the actual practice of this invention, therefore, the optimum conditions of treatment will depend upon the degree of resistance to flames and properties desired in the end product.

Within limits, higher temperatures and flow rates shorten the time required for a given degree of conversion.

The process described in this invention is very useful as a means for the preparation of precursors for conversion into completely carbonized or graphitized fibers. The advantage of the process of this invention as a preliminary step in the preparation of carbonized or graphitized fibers lies in the fact that the structural integrity of the fibers are maintained throughout the process which leads to graphite or carbon fibers having superior structure and properties.

The invention is further illustrated by the following examples in which all parts and percents are by weight unless otherwise indicated.

EXAMPLE I

A 2 liter, three-necked round bottomed flask was filled approximately one-third full with glass wool and a sample of the tape to be treated was placed on the glass wood. The outside necks of the flask were fitted with gas inlet and outlet tubes and the center neck was fitted with a thermocouple probe reaching into the center of the flask.

A sample of poly-m-phenylenebis(m-benzamido)terephthalamide (PBT) tape (2 d.p.f.) was placed in the apparatus and the nitrogen flow rate adjusted to 4.0 cu. ft./hr. The flask was placed in the oven and the temperature had become stabilized at 311° C., chlorine gas, at a flow rate of 0.4 cu. ft./hr. was admixed with the nitrogen. The tape was treated with the chlorine-nitrogen mixture for a period of 78 minutes during which time it became red-brown. On exposure to the flames of a Meker burner, the tape became black without igniting and remained dimensionally stable.

Chemical analyses of the starting material and the final product were obtained and are given in table I.

TABLE I

| td Before Treatment | After Treatment |
|---|---|
| C=68.34 | C=56.11 |
| H=4.50 | H=1.81 |
| N=11.40 | N=8.93 |
| Cl=— | Cl=20.92 |
| O (by diff.) = 15.76 | O (by diff.) = 12.23 |

From the above results, it can readily be seen that both chlorination and hydrogen abstraction occurred during the treatment and that a new composition of matter was formed.

The physical properties of a sample of PBT fiber before and after treatment are given in table II below.

TABLE II

| | Before Treatment | After Treatment |
|---|---|---|
| Denier | 2.48 | 3.08 |
| Tenacity | 5.93 | 2.39 |
| Elongation | 22.9 | 7.1 |
| Molulus$_{in}$ | 103 | 54.0 |

Samples treated at higher temperatures for shorter periods of time and at lower temperatures for longer periods of time gave similar results

EXAMPLE II

A sample of poly-m-phenylene-isophthalamide fiber (200/100) and fabric woven therefrom were treated at 311° for 50 minutes. The resulting fabric was fireproof and dimensionally stable and the fiber had the following initial and final properties:

Initial d. 1.99/Ten. 4.78/Elong.=28.0Mod$_{in}$=110
Final d. 2.50/Teh.1.67/Elong.12.0/Mod.$_{in}$=36.0

In addition to outstanding resistance to flame, this fiber exhibited excellent retention of physical properties under heat aging conditions. A sample to the above treated fiber, after heating in an air oven at 300–305°C. for 72 hours had the following properties: d. 2.36; Ten. 1.47; Elong. 7.46; Mod. 37. Moreover, a total exposure of 240 hours in the air oven at 300° C. resulted in very little additional change in physical properties; the fiber had the following properties after this treatment: d. 2.11; Ten. 1.43; Elong. 6.96; Mod. 36.

From these results, it can be seen that after a small initial loss of properties, the fiber is very stable in air at 300° C. for long periods of time.

EXAMPLE III

A sample of untreated poly-m-phenylene isophthalamide was heated in the air oven at 300° C. Fibers were removed and tested at specific time intervals. The tenacity and elongation dropped steadily.

EXAMPLE IV

A sample of the same polymer tape as used in example I was treated with a bromine-nitrogen gas mixture, using the technique described.

Bromine vapors were picked up by nitrogen gas flowing (2 cu. ft./hr.) over liquid bromine maintained at 0° C. The tape was treated for 182 minutes at 342° C. The dark, blue-black product was fireproof and had the following properties: d. 3.43; Ten. 3.19 Elong. 6.69; Mod. 71.

The treated sample had the following analysis:
C=51.39;H=2.26;N=8.25;Br=26.37.

The composition and properties of the treated material are entirely different from those of the starting material.

EXAMPLE V

A sample of the same poly-m-phenylene isophthalamide tape as used in example II was treated with a bromine-nitrogen gas mixture as in example IV. The tape was treated at 335° C. for 80 minutes and gave a fireproof dimensionally stable product having the following properties: d. 2.68; Ten. 1.71; Elong. 17.4; Modulus 37.

EXAMPLE VI

A handsheet was prepared from 70 percent 3 d.p.f. PBT flock and 30 percent PBT precipitated binder by standard TAPPI procedures. This handsheet was calendared at 170° and 3,000 p.s.i.

Strips cut from this handsheet are treated according to the method of example 1 to afford a brown, good quality paper which retains its dimensional stability and does not burn when thrust into a Meker burner flame.

Other methods for carrying out the conversion process of this invention may be used as well as that described herein. Almost any type of furnace apparatus, capable of being heated to 200–500 C. and provided with the means for controlling the flow of gases through the apparatus and exposure of the sample may be used. The apparatus and method described herein is a simple embodiment of the invention. The process could be adapted for the treatment of fabric to a continuous process in which one or more high temperature heating towers are used, the fabric passed as a continuous moving belt up the tower at a controlled rate and tension, and with a given flow rate of the halogen-insert gas mixture.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to to be included within the scope of the claims.

1. A process for the preparation of fireproof, dimensionally stable and flexible wholly aromatic polyamide shaped articles having a high surface to volume ratio comprising the steps of:
1. 1. heating said shaped article in the presence of elemental gaseous bromine or chlorine to a temperature below its softening point but sufficiently high to effect reaction with said elemental gaseous bromine or chlorine in an oxygen free atmosphere, said temperature being in the range of from about 250° C. to about 500° C; and
 2. causing said reaction to take place for a time in the range of from about 1 minute to about 12 hours.

2. The process of claim 1 wherein the polyamide is poly-m-phenylene bis(m-benzamido) terephthalamide.

3. The process of claim 1 wherein the polyamide is poly-m-phenylene isophthalamide.

4. A cross-linked, partially dehydrogenated, partially halogenated, wholly aromatic polyamide-shaped article obtained in accordance with the process of claim 1.